March 11, 1969 M. L. FREEDMAN 3,432,113

SPLIT REEL

Filed July 26, 1967

INVENTOR.
MYRON L. FREEDMAN
BY
Albert M. Parker
ATTORNEY.

3,432,113

SPLIT REEL

Myron L. Freedman, Fort Lee, N.J., assignor to Comprehensive Service Corporation, New York, N.Y., a corporation of New York Filed July 26, 1967, Ser. No. 656,164
U.S. Cl. 242—71.8 10 Claims
Int. Cl. B65h 75/18

ABSTRACT OF THE DISCLOSURE

A reel having a central hub of two interfitting parts attached to end flanges. These parts are eccentric of the axis and lock together when engaged and turned relatively to each other.

BACKGROUND OF THE INVENTION

*Field of the invention*

The invention relates to a device for releasably locking two parts together, and more particularly relates to a split reel wherein said parts form a central hub joining the spaced flanges of the reel.

*Description of the prior art*

Prior split reels have included a transversely split hub, the opposed flanges of the reel being secured to the respective parts of the hub. The parts of the hub in some reels are joined by a threaded connection. Reels of this type are prone to binding of the screw threaded connection since the flexible material being wound on the reel in its intended direction of rotation tends to tighten the parts of the hub together through frictional contact with the removable flange. On the other hand, such reels cannot be safely rotated in use in the opposite direction, since the removable flange then tends to become loosened by its engagement by the flexible material being wound, such flange frequently eventually spinning off.

Another type of split reel employs spring pressed ball detents between the parts of the hub. In use, such ball detents have proved to be difficult and time consuming to release.

SUMMARY OF THE INVENTION

The split reel of the invention has a transversely divided hub, the flanges of the reel being secured to the respective parts of the hub. Elongated flexible material is wound upon a core which is telescoped over the hub of the reel. A first flange of the reel and the first part of the hub attached thereto are drivingly connected to a driven shaft upon which the reel is mounted, the core being keyed to the first flange for rotation therewith. The second flange of the reel and the second part of the hub, which is attached to the second flange, are removable from the first parts of the reel so as to leave the core with a coil of material wound thereon free for axial removal from the first part of the hub.

Means associated with the reel mounts the two parts of the reel hub coaxially of each other. In one embodiment the two parts of the reel hub are locked together independently of the mounting shaft for the reel; such shaft extends through the axial passage in the sleeve.

In a second disclosed embodiment, the means mounting the two parts of the reel hub coaxially of each other is the shaft upon which the reel is mounted, such shaft extending through aligned longitudinal axial passages in the two parts of the hub of the reel.

In the embodiments shown, one of the locking formations is in the form of a projection having a peripheral surface in the form of a body of revolution projecting from one end of one of the parts of the hub parallel to the axis of said hub part but disposed eccentrically of such axis. The other of the locking formations is a socket or recess in that end of the other hub part which confronts said projection, such socket having a peripheral surface in the form of a body of revolution.

Upon the turning of the two parts of the hub relative to each other from the position in which they have been axially assembled, the surfaces of the projection and socket interfere, thereby to lock the two parts of the hub together against axial separation and further relative rotation in the same direction. The two parts of the hub may be readily released from each other by turning them relative to each other in the direction opposite from that employed to lock them together.

BRIEF DESCRIPTION OF THE DRAWING

In the drawings, wherein like reference characters refer to like parts throughout the several views.

DESCRIPTION OF THE PREFERRED EMBODIMENTS

Figures 1, 2, 3, 4, 5, 6, 7, 8:
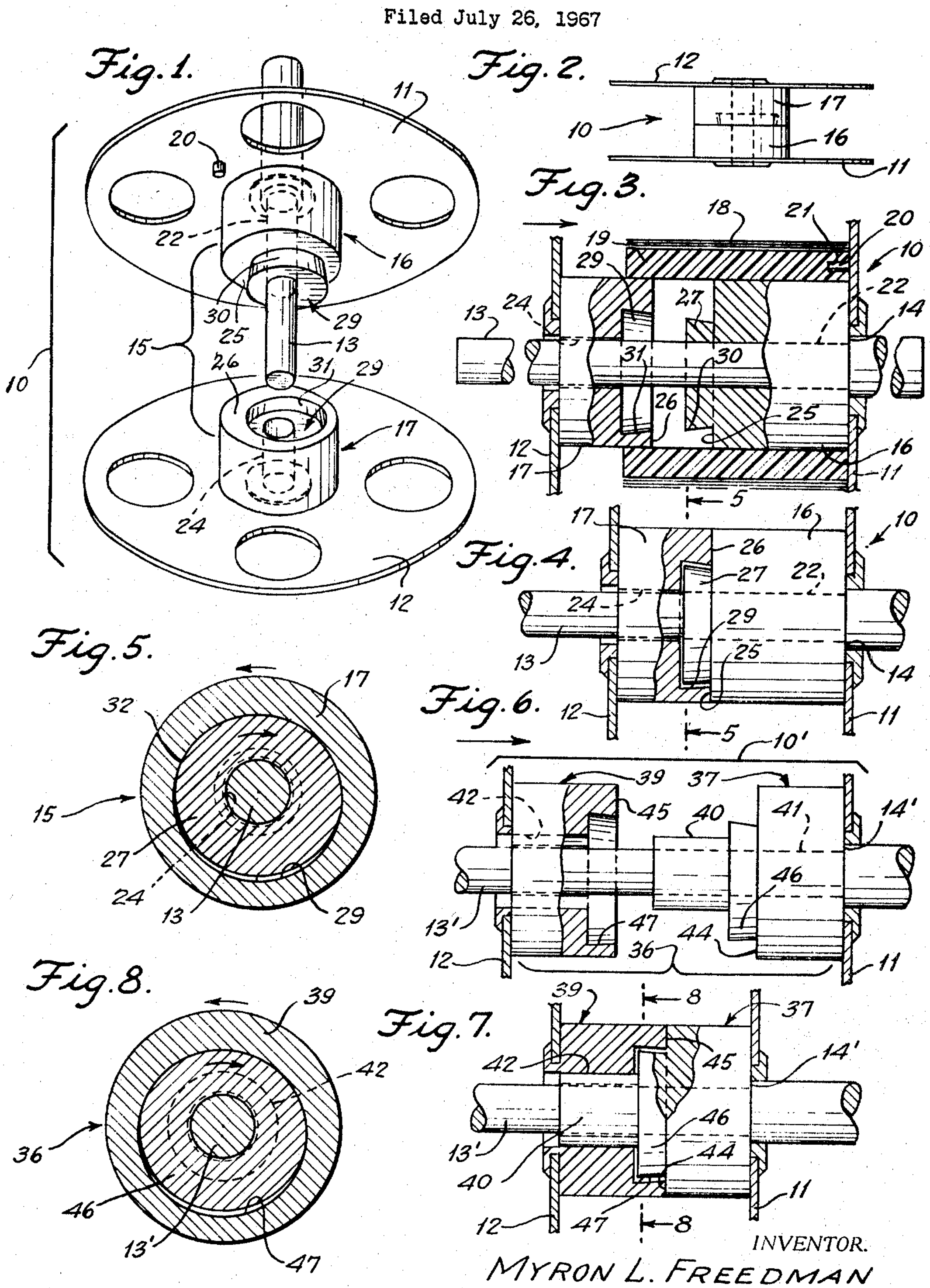
FIG. 1 is an exploded view in perspective of a reel incorporating a first disclosed embodiment of split hub in accordance with the invention, a portion of a shaft on which the reel is adapted to be mounted being shown.
FIG. 2 is a view in plan on a smaller scale of the reel of FIG. 1 with the parts thereof in assembled relationship.
FIG. 3 is a fragmentary view partially in elevation and partially in axial section of the reel of FIG. 1, the parts of the hub of the reel being shown separated, a core upon which film is wound, and the shaft upon which the reel is mounted also being shown.
FIG. 4 is a view similar to FIG. 3 but with the parts of the hub of the reel in assembled, connected position.
FIG. 5 is a view in transverse section through the assembled hub of the first embodiment of reel, the section being taken along the line 5—5 of FIG. 4.
FIG. 6 is a fragmentary view partially in elevation and partially in axial section of a second preferred embodiment of a reel in accordance with the invention, the parts of the hub of the reel being shown separated, the shaft upon which the reel is mounted being shown.
FIG. 7 is a view similar to FIG. 6 but with the parts of the hub of the reel in assembled, connected position.
FIG. 8 is a view in transverse section through the assembled hub of the second embodiment of reel, the section being taken along the line 8–8 of FIG. 7.

As is apparent from the foregoing, two embodiments of split reels in accordance with the invention are illustrated and described herein, the first being shown in FIGS. 1–5, inclusive, and the second being shown in FIGS. 6, 7, and 8.

The first illustrative embodiment of reel (FIGS. 1–5, inclusive) is generally designated by the reference character 10. The reel 10 has spaced parallel flanges 11 and 12 which are secured to the opposite ends of a split hub 15 which is disposed between and coaxially of the flanges. In use, the reel 10 is mounted upon a shaft 13, the shaft being shown as having an annular shoulder 14 against which the right-hand end of the reel (FIGS. 3 and 4) abuts.

The hub 15 of the reel is made up of a first part 16, to which flange 11 is secured, and a second part 17, to which flange 12 is secured. The parts 16 and 17 of the hub have peripheral surfaces of circular cylindrical shape, such surfaces forming a single circular cylinder when they are in assembled, connected relationship as shown in FIG. 4. The hub 15 is adapted to receive a core 19 thereover, the core receiving film strip 18 wound thereon. The core is held from rotation with respect to the hub 15 by an axially inwardly projecting dog or lug 20 on flange 11 and a recess 21 in the confronting end of the core accurately receiving the dog. In the normal use of the reel, the core 19 and the film strip 18 wound thereon remain on part 16 of the hub of the reel when the part 17 of the hub and the flange 12 connected thereto are disconnected and removed from the parts 16, 17. Thereafter the core and the film strip wound thereon may be removed axially from the hub part 16 and the shaft 13.

The hub part 16 has an axial bore 22 therethrough, and the hub part 17 has an axial bore 24 therethrough, such bore accurately receiving the smaller diametered outer end portion of the shaft 13 beyond shoulder 14. The hub part 16 has an axially inner annular end surface 25 (at the left in FIGS. 3 and 4), and the hub part 17 has an axially inner annular end surface 26 which confronts and accurately engages surface 25 when the hub parts are assembled and connected as shown in FIG. 4.

The means for connecting the hub parts 16 and 17 is formed by an axially projecting formation 27 on the axially inner end of part 16, and a recess 29 in the confronting end of part 17. The projection 27 and the recess 29 have peripheral surfaces 30 and 31, respectively, in the form of similar surfaces of revolution which are disposed eccentric of the axis of shaft 13 and bores 22 and 24 in hub parts 16 and 17. Recess 29 has a diameter which somewhat exceeds that of the projection 27, so that the projection is freely axially receivable within the recess when the parts 16 and 17 of the hub are disposed within a substantial angular range relative to each other. After the parts 16 and 17 have been assembled into the position of FIG. 4, the turning of parts 16 and 17 in either direction relative to each other causes such parts securely frictionally to be locked together against both further turning with respect to each other and axial separation by reason of engagement of surface 30 of projection 27 with surface 31 of recess 29 over an extended area 32 as shown in FIG. 5. The hub parts are released from each other by turning them relative to each other in the direction opposite the direction of locking rotation.

In the embodiment of FIGS. 1–5, inclusive, not only are the parts 16 and 17 of the hub locked together when they are positioned as in FIGS. 4 and 5, but they are also locked to the shaft 13 by reason of the thrust reaction between the shaft 13 and the surfaces of bores 22 and 24. Thus such embodiment of reel is used with a shaft 13 with which the reel rotates, the shaft being either idle, when film strip is unwound from the reel or driven, when film strip is wound upon the reel.

The projection 27 and the recess 29 are preferably, although not necessarily, of frustoconical configuration as shown, the frustums of the cones being coaxial of the shaft 13 and bores 22 and 24 and converging toward the hub part 16 which carries the projection. Because of such configuration of the projection and the recess, the turning of the hub parts 16 and 17 relative to each other to lock them together also tends to draw them axially toward each other so that the surfaces 25 and 26 engage each other, whereby accurately to locate the flanges 11 and 12 of the reel with respect to each other.

The second embodiment of reel, shown in FIGS. 6, 7, and 8, is generally designated 10'. Such reel is shown mounted upon a shaft 13' having a shoulder 14'. In this embodiment, the reel 10' is not locked to the shaft as a result of the locking of the two parts of the split hub of the reel together. The reel may thus be mounted to rotate freely on the shaft, or it may be secured to the shaft to rotate therewith by means not shown.

The split hub of reel 10' is generally designated 36. The righthand (FIGS. 6 and 7) part of hub 36, to which flange 11 is secured, is designated 37; the other part of hub 36, to which flange 12 is secured, is designated 39, Projecting to the left (FIG. 6) axially from part 37 is a central circular cylindrical sleeve or pilot pin 40. The main body of part 37 and the sleeve 40 have an axial bore 41 therethrough which accurately receives the smalled diametered portion of the shaft 13'. The sleeve 40 is accurately received within a bore 42 which extends through the part 39 of the hub. It will be seen that the shaft 13' is journalled solely in the bore 41 in part 37 of the hub, and is thus isolated from reactions arising from the locking of the parts of the hub together.

The parts 37 and 39 of the hub are selectively locked together by means which is similar to that of FIGS. 1–5, inclusive. A frustoconical projection 46 on part 37 is received within a frustoconical recess 47 in part 39. When the parts are tightened together as described, the annular axially inner end surface 44 on part 37 forcibly engages the confronting end surface 45 on part 39, whereby the flanges 11 and 12 are maintained accurately spaced a predetermined distance apart.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A reel for elongated flexible material, said reel having spaced parallel flanges adapted to be releasably connected by a hub, said hub comprising two bodies which when assembled and connected are adapted to be rotated together in coaxial relationship about the common longitudinal axis of the reel, the flanges of the reel being fixedly connected to the respective bodies, and means for selectively locking the assembled bodies together for joint rotation about said axis, said last named means comprising axially projecting means on the axially inner end of one of the bodies, and an axially extending socket in the confronting, axially inner end of the other body, the projecting means and the socket having peripheral surfaces, portions of which are generally surfaces of revolution having axes which are generally parallel to but radially displaced from the longitudinal axes of the respective bodies, the projecting means being axially receivable within the socket in one angular position of the bodies relative to each other upon assembly of the bodies, the projecting means and the socket being so constructed and arranged that upon turning of the assembled bodies relative to each other said portions of the peripheral surfaces of the projection and socket engage each other to prevent further turning of the bodies in the same direction relative to each other and frictionally lock the bodies together for joint rotation.

2. A reel as claimed in claim 1, wherein the projection and the socket have peripheral surfaces which are similar and surfaces of revolution.

3. A reel as claimed in claim 1, comprising means cooperating with said two bodies for retaining them in coaxial relationship while permitting them to move appreciable distances toward and away from each other when released from each other.

4. A reel as claimed in claim 3, wherein the means cooperating with said two bodies for retaining them in coaxial relationship comprises an axially extending pilot pin on one of said bodies coaxial with said longitudinal axis, and a cylindrical passage in the other body coaxial with said longitudinal axis, said passage being adapted accurately to receive said pilot pin.

5. A reel as claimed in claim 4, wherein the pilot pin is on the body bearing the projection.

6. A reel as claimed in claim 5, wherein the pilot pin is in the form of a sleeve having an axial bore therethrough adapted to receive an axle supporting the reel.

7. A reel as claimed in claim 3, wherein the means cooperating with said two bodies for retaining them in coaxial relationship comprises aligned circular cylindrical passages in said bodies coaxial of said longitudinal axis of the reel, and an axle pin accurately received in said passages.

8. A reel as claimed in claim 7, wherein said passages extend through said bodies, and said axle pin extends through and beyond the ends of the respective passages in said bodies and engages the walls of both passages, the axle pin being locked to the reel so as to rotate therewith when the assembled bodies forming the hub of the reel are locked together.

9. A reel as claimed in claim 1, wherein the said portion of the peripheral wall of the socket lies radially outwardly furthest from the common axis of the hub, is of frustoconical shape, and converges in the axial direction toward the body bearing the projecting means, and the said portion of the peripheral surface of the projecting means lies radially outwardly furthest from the common axis of the hub, is of frustoconical shape, and converges in the same axial direction as the said portion of the socket, whereby when the bodies are assembled with the projecting means within the socket and are then turned relative to each other the said portion of the projecting means locks axially behind the said portion of the peripheral surface of the socket and tends to pull the two bodies together.

10. A reel as claimed in claim 9, wherein the projection and the socket have peripheral surfaces which are similar and frustoconical.

References Cited

UNITED STATES PATENTS

| | | | |
|---|---|---|---|
| 1,991,853 | 2/1935 | Howell | 242—68.3 |
| 2,225,987 | 12/1940 | Goldberg. | |
| 2,518,533 | 8/1950 | Edwards | 242—71.8 |

NATHAN L. MINTZ, *Primary Examiner.*